US011967062B2

(12) United States Patent
Cheng et al.

(10) Patent No.: US 11,967,062 B2
(45) Date of Patent: *Apr. 23, 2024

(54) METHOD AND SYSTEM FOR AUTOMATIC DETECTION AND RECOGNITION OF A DIGITAL IMAGE

(71) Applicant: GOWIN Semiconductor Corporation, GuangZhou (CN)

(72) Inventors: Chi Kit Cheng, Hong Kong (CN); Grant Thomas Jennings, Austin, TX (US)

(73) Assignee: GOWIN SEMICONDUCTOR CORPORATION, Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,263

(22) Filed: Mar. 24, 2023

(65) Prior Publication Data

US 2023/0237639 A1 Jul. 27, 2023

Related U.S. Application Data

(63) Continuation of application No. 17/489,749, filed on Sep. 29, 2021, now Pat. No. 11,615,522.

(51) Int. Cl.
*G06T 7/00* (2017.01)
*G06T 1/00* (2006.01)
(Continued)

(52) U.S. Cl.
CPC .......... *G06T 7/0004* (2013.01); *G06T 1/0007* (2013.01); *G06T 7/11* (2017.01);
(Continued)

(58) Field of Classification Search
CPC .. H04N 19/105; H04N 19/119; H04N 19/176; H04N 19/186; H04N 19/436; H04N 19/52; H04N 19/55; H04N 19/70; H04N 19/96; H04N 19/147; H04N 19/182; H04N 19/583; H04N 19/80
See application file for complete search history.

(56) References Cited

U.S. PATENT DOCUMENTS

2017/0364734 A1* 12/2017 Melugin ................ G01D 4/008
2019/0297395 A1* 9/2019 Huang ................... H04N 7/183
2022/0207280 A1* 6/2022 Aiello .................... G06V 20/63

* cited by examiner

*Primary Examiner* — Richard T Torrente
(74) *Attorney, Agent, or Firm* — JW Law Group; James M. Wu

(57) ABSTRACT

An automatic measuring system containing configurable integrated circuits is able to process information via captured images. The automatic measuring system includes a metering instrument, a camera, a recognition module, and a localization module. The metering instrument has at least one display for visually displaying a number and measures the amount of measurable substance or resources (i.e., electricity and water) consumed. The camera captures an image of the number representing at least a portion the amount of measurable substance. The recognition module is operable to generate a value in response to the image and the coordinates wherein the coordinates are used to decode the image via restoring captured image to the original readout counter value. The localization module is removably or remotely coupled to the camera and operable to generate the coordinates in accordance with the image captured by the camera.

22 Claims, 12 Drawing Sheets

(51) Int. Cl.
  *G06T 7/11* (2017.01)
  *G06T 7/70* (2017.01)
  *G06V 20/00* (2022.01)
  *H04N 7/18* (2006.01)
  *H04N 23/80* (2023.01)
(52) U.S. Cl.
  CPC ................ *G06T 7/70* (2017.01); *G06V 20/36* (2022.01); *H04N 7/18* (2013.01); *H04N 23/80* (2023.01); *G06T 2207/20132* (2013.01); *G06T 2207/30164* (2013.01)

METHOD AND SYSTEM FOR AUTOMATIC DETECTION AND RECOGNITION OF A DIGITAL IMAGE

PRIORITY

This patent application is a continuation patent application of a co-pending U.S. patent application having a U.S. patent application Ser. No. 17/489,749, filed on Sep. 29, 2021 in the name of the same inventor and entitled "Method and System for Automatic Detection and Recognition of A Digital Image," issued into a U.S. patent with a U.S. Pat. No. 11,615,522, on Mar. 28, 2023, which is hereby incorporated herein by reference in its entirety.

FIELD

The exemplary embodiment(s) of the present invention relates to the field of programmable semiconductor devices for computer hardware and software. More specifically, the exemplary embodiment(s) of the present invention relates to a system containing a field-programmable gate array ("FPGA") capable of automatically reading a meter via a captured image.

BACKGROUND

A traditional electro-mechanical meter, such as an electricity meter, electric meter, electrical meter, energy meter, kilowatt-hour meter, gas meter, water meter, and/or pressure meter, is a measuring instrument or device that measures for example the amount of electric energy or water consumed by a residence, a business, or an electrically powered apparatus. For example, utility companies use electric meters installed at customers' premises for purposes of billing and/or monitoring. A drawback relating to a traditional or conventional electro-mechanical meter is that the output values or counted values of the meter need to be read out manually. For example, taking the meter reading manually on a regular basis is common, but the task of manual reading a meter can be tedious, costly, and prone to errors.

A conventional approach to overcome the manual reading is the creation of smart meter which, for example, can generate and transmit pulses to meter interfacing unit so that the counter can be accurately and instantaneously acquired. A problem associated with using smart meters is that the replacing hundreds and/or thousands of existing traditional meters can take a lot of time and effort.

SUMMARY

On embodiment of the presently claimed invention discloses an automatic measuring system ("AMS") using one or more configurable integrated circuits ("ICs") for processing information via captured images. AMS includes a metering instrument, a camera, a recognition module, and a localization module. The metering instrument, having at least one display for visually displaying a number, is able to measure the amount of consumable and/or substance consumed by a customer within a period of time. For example, consumable or substance can be electricity, gas, and/or water, The camera, having a lens, is used to capture an image containing one or multiple numbers indicating that the amount of consumable and/or substance that has been consumed. The recognition module is used to calculate a counter value indicating the amount of substance that has been consumed based on the image and coordinates. The coordinates are used to facilitate restoring the readout counter image captured in the image to the original readout counter value displayed by the meter. The localization module which can be removed from AMS. A function of localization module is to generate a set of coordinates according to the image captured by the camera.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
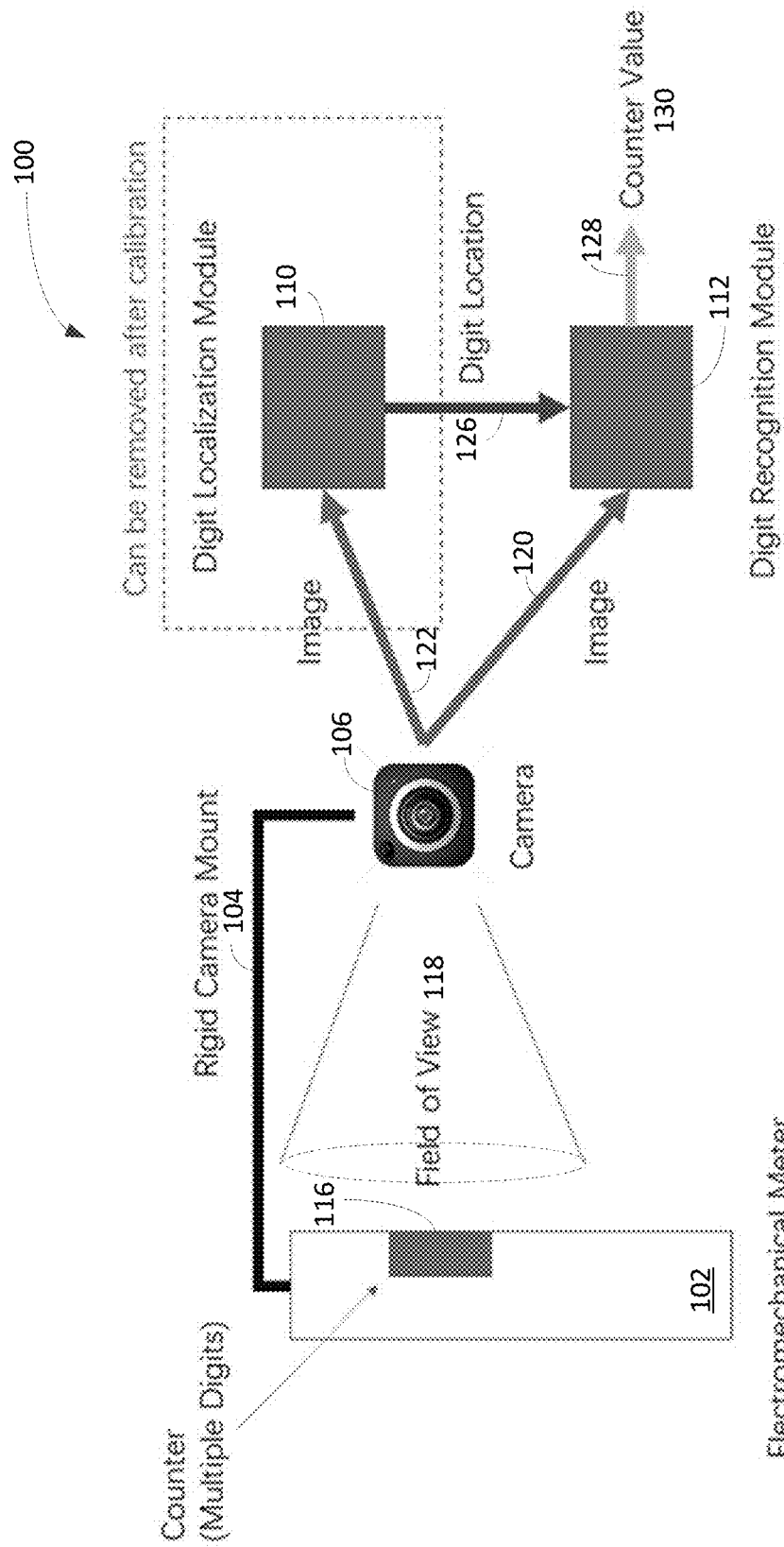
FIG. 1 is a block diagram illustrating an AMS employing one or more FPGA and/or wireless accessible PLD ("WAP") to perform one or more automatic meter readings in accordance with one embodiment of the present invention.

Embodiments of the present invention disclose a method(s) and/or apparatus for providing an automatic measuring system ("AMS") capable of reading one or more measuring meters.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

On embodiment discloses an AMS containing one or more configurable ICs or FPGAs capable of processing information based on captured images. AMS includes a meter, a camera, a recognition module, and a localization module. The meter, having at least one display for visually displaying a number, measures the amount of consumable and/or measurable substance. For example, consumable or measurable substance can be electricity, gas, steam, heat, thermal liquid, alcohol, and/or water, The camera is used to capture one or more images wherein each image may contain one or more numbers indicating the amount of substance or resource consumed. The recognition module calculates a counter value indicating the amount of substance consumed based on the image and coordinates. The coordinates, in one embodiment, are used to facilitate decoding or restoring the readout counter image shown in the image to an original readout counter value displayed by the meter. The localization module provides the coordinates for calibration and it is removed from AMS after the calibration.

FIG. 1 is a block diagram illustrating an AMS 100 employing one or more FPGA and/or wireless accessible PLD ("WAP") to perform one or more automatic meter readings in accordance with one embodiment of the present invention. AMS 100 includes a meter 102, a camera 106, a localization module 110, and a recognition module 112. In one example, AMS 100 further includes a rigid camera mount 104 used to anchor camera 106 to a fixed location allowing camera 104 has a field of view 118 of display 116. It should be noted that the underlying concept of the exemplary embodiment(s) of the present invention would not change if one or more blocks (circuit or elements) were added to or removed from FIG. 1.

Meter 102, also known as a metering instrument or measuring instrument, is used to count or measure the amount of measurable substance or resources consumed by a residential home, business entity, and/or electronic device. The measurable substance, moving substance, flowing substance, consumable resources, and/or substance can be, but not limited to, electricity, natural gas, water, chemical solutions, air flow, air pressure, thermal liquid, and the like. Meter 102 includes a display 116 which can be structured in various configurations, such as a sequence of digits, a group of dials, a serial numbers, a screen displaying a value, a bar, a line, and so on. The digits or numbers displayed on display 116 are the original readout or readout counter value. For example, display 116 displays or projects 10,000 which indicates a readout counter value of 10 kilowatt of electricity that has been consumed.

Meter 102, in one example, can be an electro-mechanical meter, electricity meter, electric meter, electrical meter, energy meter, kilowatt-hour meter, gas meter, displacement water meter, pressure meter, or the like. A function of meter 102 is to measure or count the amount of resource or substance such as electricity consumed by a customer or device. Another function of meter 102 is to assist a supplier such as a power company to manage the operation. For example, a municipal water company installs electric meters at customers' premises for billing as well as supply management.

Camera 106 is an optical instrument capable of capturing one or more images or videos via its lens through a field of view 118. For example, camera 106, which includes a lens and aperture, captures an image or a serial of images based on orientation of its lens that has a field of view 118. Camera 106, in one aspect, is a semiconductor imager or optical sensor capable of being fabricated via a semiconductor process. Image sensors can be fabricated by chips and/or together as part of FPGA die. Camera 106, in one embodiment, is placed, fixed, or anchored at a predefined distance from display 116 of meter 102 whereby a field of view 118 between display 116 and camera 106 is established. Field of view 118 illustrates an exemplary distance between display 116 and camera 106 in which the lens of camera 106 capturing its view of surrounding environment. When field of view 118 includes display 116 of meter 102, camera 106 can capture an image of readout counter value displayed by display 116.

Localization module 110, also known as digit localization module ("DLM") or localization unit, is structured as a removable unit or module capable of being detached or separated from AMS (or camera 106) after the coordinate(s) or digit location is calculated or calibrated. For example, the coordinates, also known as location coordinates, digit locations, and/or counter orientation, is a set of physical coordinates and angle(s) which are used to compensate image distortion due to meter installation and/or meter types. To identifying the coordinates, DLM 110, in one embodiment, employs a multi-task model and a processor to calculate digit coordinates which can be used to correct the distorted digits in the captured image.

DLM 110 further includes a camera interface for facilitating receipt of images from a camera-to-localization ("CL") bus 122. DLM 110 also includes a recognition interface for transmitting the coordinates to DRM 112 via a localization-to-recognition ("LR") bus 126. Depending on the applications, CL bus 122 and LR bus 126 can either be cables, wires, wireless links, and/or a combination of cables, wires, and wireless links. After calibration, both CL bus 122 and LR bus 126 can be disconnected or removed whereby DLM 110 can be separated from AMS 100. An FPGA, in one aspect, is used to host DLM 110.

Recognition module 112, also known as digit recognition module ("DRM"), is capable of generating counter value 130 via an output 128 based on images received from camera 106 and the coordinates received from DLM 110. In one aspect, upon receipt of the coordinates (or digit location) from DLM 110 via LR bus 126, DRM 112 stores the coordinates in a local storage or memory. Since field of view 118 is fixed by rigid camera mount 104, the coordinates can be used repeatedly whereby additional coordinates calculation and/or calibration is not required.

DRM 112 includes an interface for facilitating receipt of images from a camera-to-recognition ("CR") bus 120. DRM 112 also includes a recognition interface for receiving the coordinates from DLM 110 via LR bus 126. Depending on the applications, CR bus 120 and LR bus 126 can either be cables, wires, wireless links, and/or a combination of cables, wires, and wireless links. In one aspect, camera 106 and recognition module 112 can be fabricated or structured or placed in a single device, IC, or semiconductor die. In one embodiment, DRM 112 can be embedded in an FPGA.

In operation, camera 106, based on field of view 118, captures an image containing multiple digits representing readout counter value generated by meter 102. The image or images are forward to DLM 110 via CL bus 122 for coordinate calculation or calibration. The image or images are also forward to DRM 112 via CR bus 120 for output counter output 130. Upon receipt of the coordinates from DLM 110, DRM 112 generates counter value 130 which should be the same or substantially the same to the readout counter value displayed by display 116.

AMS 100, in one embodiment, is configured to use its communication block to periodically communicate with a predefined entity such as a power company or a water company for collecting and/or managing commodity and/or resource supply. For example, a power company can use AMS 100 to record the power usage of each customer over a period of time. The communication block of AMS 100 can be land (wire) based, wireless based, or a combination of land and wireless based communication network. For example, a wireless communication block within an FPGA can be configured to provide network communications for AMS 100.

Alternatively, meter 102, which can be an electromechanical meter, includes a display 116 configured to display its reading (i.e., counter) or readout counter value indicating the amount of substances such as electricity or water that has been consumed. Camera 106 is attached to meter 102 through rigid camera mount 104 so that field of view 118 of camera 106 can cover the entire counter region of meter 102. Captured image is transferred to both DLM 110 and DRM 112. It should be noted that the position, size, orientation (i.e., angle of rotation) of counter in the captured image is difficult to control partially because the distorted counter in the captured image may depend on the installation of each individual meter. Each distorted counter in the captured image may vary between the meters. Accordingly, DLM 110 is used to detect the counter and locate the digits during the calibration process during the setup process. Once completed, DLM 110 can be removed. Unless the position of camera 106 relative to the meter changes frequently, permanent installation of DLM 110 to AMS 100 is not necessary. DRM 112, which receives and saves the digit location from DLM 110, recognizes each digit and outputs the counter value 130.

In another exemplarily embodiment, AMS or system 100, containing configurable ICs or FPGAs for processing information via captured images, includes a metering instrument, a camera, a recognition module. The metering instrument such as meter 102 containing at least one display for visually displaying a number as a readout counter value is configured to record amount of measurable substance within a predefined time period. The measurable substance is electricity, natural gas, oil, air, heat, pressure, steam, and water. The metering instrument can be an electrical meter for metering usage of electricity, gas meter for measuring usage of natural gas, thermal meter for metering heat or cold, steam meter for measuring steam, or water meter for counting usage of water.

The camera such as camera 106 is used to capture an image containing number(s) representing at least a portion of measurable substance. The camera is an optical device having a lens capable of capturing one or more images displayed by the display of the metering instrument. In one application, the camera is configured to capture a sequence of digits displayed by the display.

The recognition module such as DRM 112 is operable to generate a counter value in response to the image and coordinates which is used to minimize image distortion. AMS 100 further includes a localization module such as DLM 110 which is removably coupled to the camera and/or AMS 100. A function of localization module is to generate the coordinates in accordance with the image captured by camera 106.

The localization module such as DLM 110 further includes an interface, multi-task model, and controller (or CPU) wherein the interface is used to facilitate removably coupling to the camera via a communication channel such as CL bus 122 for receiving the image from camera 106. The multi-task model block is operable to detect at least one digit from the image and an angle prediction. The controller, in one aspect, is configured to generate a set of coordinates at least partially based the angle prediction. Note that the communication channel such as CL bus 122 can be a wireless connection via a local onboard wireless transceiver block.

The localization module further includes a recognition interface used to facilitate removably coupling or connection to the recognition module via a communication channel such as LR bus 126 for supplying the coordinates to the recognition module. An FPGA may be programmed to host the localization module. It should be noted that LR bus 126 can be a wireless connection via a local onboard wireless transceiver block. In one aspect, the localization module such as DLM 110 further includes an image cropping block and an image rotation block. The image cropping block is used to crop boundaries of the image based on the coordinates and the image rotation block is capable of rotating the image based on the angle prediction.

In one embodiment, an FPGA is used to perform functions provided by the recognition module such as DRM 112. The recognition module includes a buffer and an interface wherein the buffer is used to temporarily store one or more images representing one or more digital numbers from the camera. The interface is used to manage communication with a localization module via RL bus 126 for receiving information relating to the coordinates. The coordinates include information relating to digit locations and angle of rotation. The recognition module includes a local memory for storing the coordinates. In one aspect, the recognition module includes an image cropping block and an image rotation block. The image cropping block is operable to crop boundaries of the image based on at least one digit location. The image rotation block is operable to rotate the image based on the angle of rotation.

An advantage of using AMS 100 is that localization module 110 can be removed from AMS after image calibration whereby simplify overall AMS configuration.

Figure 2A:
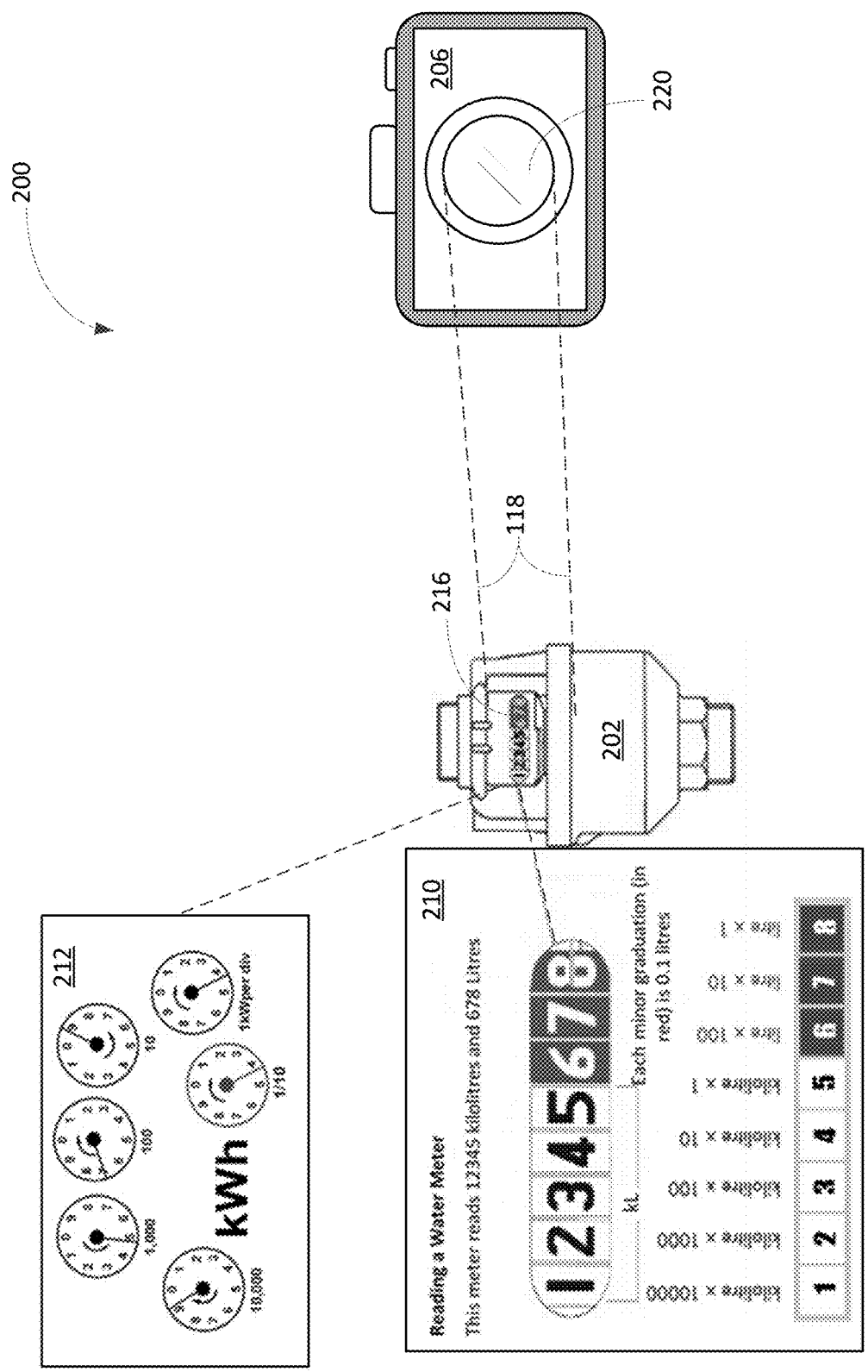
FIGS. 2A-2B are block diagrams illustrating an exemplary meter displaying a sequence of numbers observed by a camera in accordance with one embodiment of the present invention.

FIG. 2A is a block diagram 200 illustrating an exemplary meter displaying a sequence of numbers observed by a camera in accordance with one embodiment of the present invention. Diagram 200 includes a meter 202 and a camera 206. Camera 206 includes a lens 220 which is oriented in such a way that its field of view 118 is focused on display 216 of meter 202. It should be noted that the underlying concept of the exemplary embodiment(s) of the present invention would not change if one or more blocks (circuit or elements) were added to or removed from diagram 200.

Meter 200, for example, includes display 216 capable of displaying a sequence of eight (8) digits or numbers representing a readout counter value of a water meter as indicated by numeral 210. While the largest digit represents 10,000 kiloliter of water, the smallest digit represents one (1) liter of water. The eight (8) digits or number can either be mechanical numbers or electronic digital display. In another example, meter 200 includes display 216 capable of displaying a group dials representing a reading of an electrical meter as indicated by numeral 212. While the largest dial represents 10,000 kilowatt hour ("kWh") of electricity, the smallest dial represents 0.1 kWh. The dials can either be mechanical dials or electronic images as dial configuration.

It should be noted that meter display 216 can be arrange in various other illustrations, such as, but not limited to, bar scales, pi scales, letters, waves, and the like. Meter 202, which can be an electro-mechanical meter, is used as an electricity meter, electric meter, electrical meter, energy meter, kilowatt-hour meter, gas meter, water meter, and/or pressure meter for measuring the amount of substances or resources consumed by an entity or device.

Figure 2B:
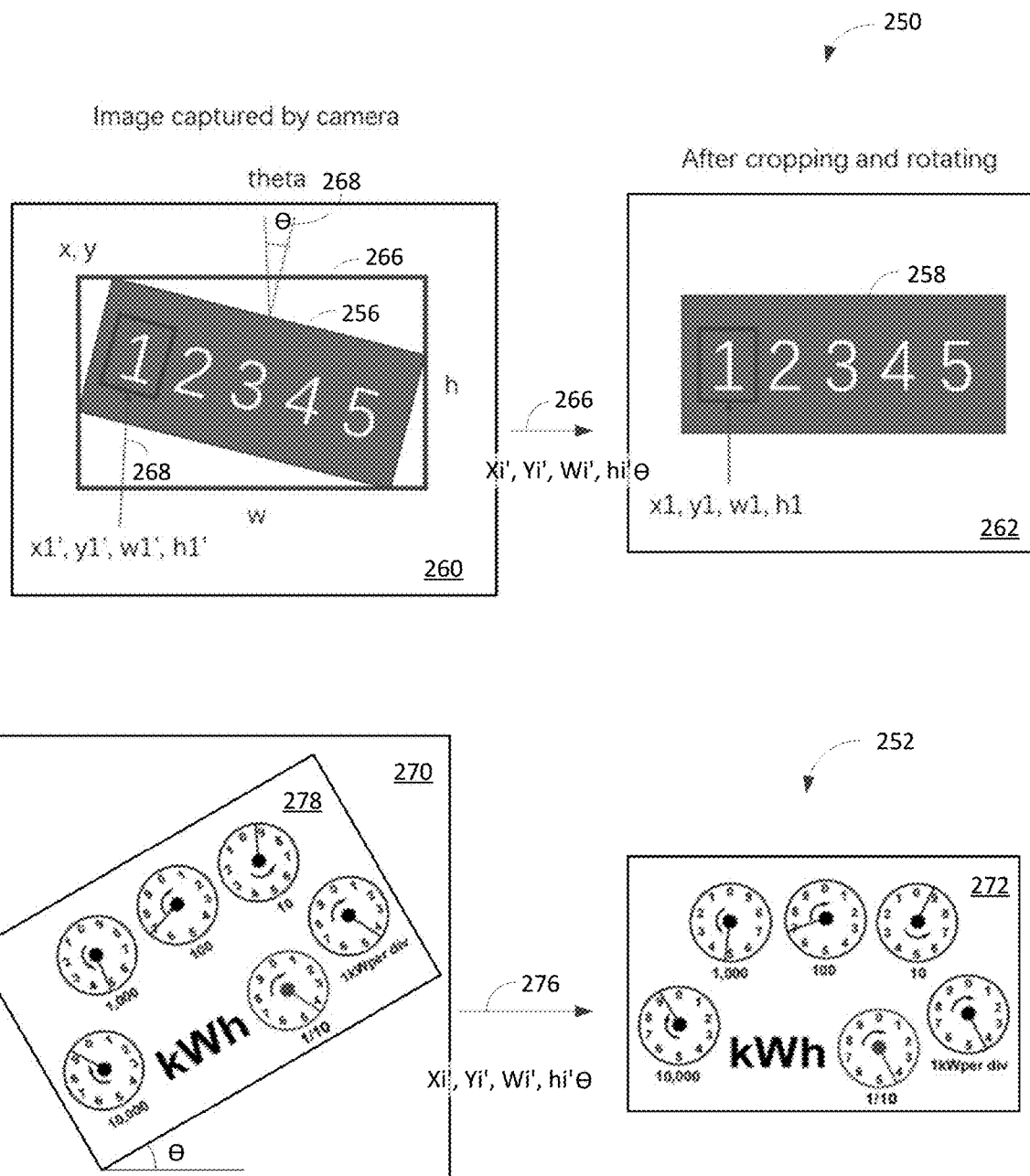

FIG. 2B illustrates block diagrams 250-252 showing discrepancy or distorted images from non-distorted reading number or readout counter value displayed by the meter in accordance with one embodiment of the present invention. Diagram 250 illustrates a captured image 260 and a restored image 262 after cropping and rotating. Similarly, diagram 252 illustrates a distorted image 270 captured by the camera and a restored image 272 after cropping and rotating. It should be noted that a readout counter image 256 is a digitized electronic copy of a readout counter value displayed by the meter. Depending on the processing of picture taking as well as field of view, the readout counter image 256 may be a distorted version of the readout counter value. For example, the readout counter image 256 could be rotated certain angles such as θ° rotated from the original readout counter value displayed by the meter.

Upon capturing or photographing an image by a camera with its lens aim at a field of view focusing at the display of meter, an image or picture 260 is obtained. While image 260 presents a distorted meter reading, image 260 is forwarded to DLM and DRM via wired or wireless transmissions. After receiving image 260 from the camera (not shown in diagram 250), DLM identifies a bounding box 266 with x, y, w, h and angle θ (theta) 268 for setting a minimal boundary for a distorted readout counter image 256. It should be noted that a bounding box is an imaginary rectangle box that is used for a reference point of an object. Angle θ 268 is an angular projection indicating a degree of readout counter image 256 captured in image should be rotated to restore to the original readout counter value displayed by the meter.

A function of DLM, in one aspect, is to identify a set of coordinates which can be used to restore readout counter image 256 to the original or substantially similar to the original readout counter value as indicated by numeral 258. The coordinates include, but not limited to, xi, yi, wi, hi, θi for a bounding box of each digit, number, or dial. To accurately obtain or identify a readout counter value, the coordinates are needed to facilitate cropping, rotating, and scaling to restore readout counter image 256 to its non-distorted or less distorted counter value. For example, upon detecting bounding box 266, DLM generates x1', y1', w1', h1' θ1 for first digit "1" as indicated by numeral 268. Once the bounding box of each digit (i.e., xi, yi, wi, hi) is identified, the coordinates (i.e., xi, yi, wi, hi) are mapped back to the captured image domain (i.e., xi', yi', wi', hi') for re-orientated or restored the readout counter image to its original orientation.

The distortion of readout counter value could be caused by various reasons. For example, installation of the meter, type of meter, model of measuring instrument, aging of the meter, and noise during image transmission. To restore the readout counter image, DLM forwards the coordinates to DRM as indicated by numeral 266. It should be noted that transmitting information of coordinates from DLM to DRM can be wired or wireless network transmission.

After receiving the coordinates from DLM and captured image 260 from the camera, DRM, in one embodiment, crops, rotates, and scales each digit in image 260 in response to the coordinates. After cropping, rotating, and scaling, DRM generates a restored image 262 containing re-orientated readout counter value 258 with updated coordinates x1, y1, w1, and h1. The counter value is recognized or obtained after the restored image 262 is accomplished.

An advantage of using DLM and DRM is that it is relatively simple and cost effective method to automatically read a meter without the meter reader manually reads the meter.

Diagram 252 is similar to diagram 250 except that instead of numeral or digital representation, dials are used for the meter. Upon capturing an image 270 by a camera, the image 270 containing readout counter image using dials is transmitted to DLM and DRM. After identifying the coordinates associated with the dials within the bounding box 278, the coordinates (i.e., xi', yi', wi', hi', θ) are forwarded from DLM to DRM as indicated by numeral 276. Upon restoring or re-orienting readout counter image, the counter value is identified based on the restored readout counter image 272.

Figure 3:
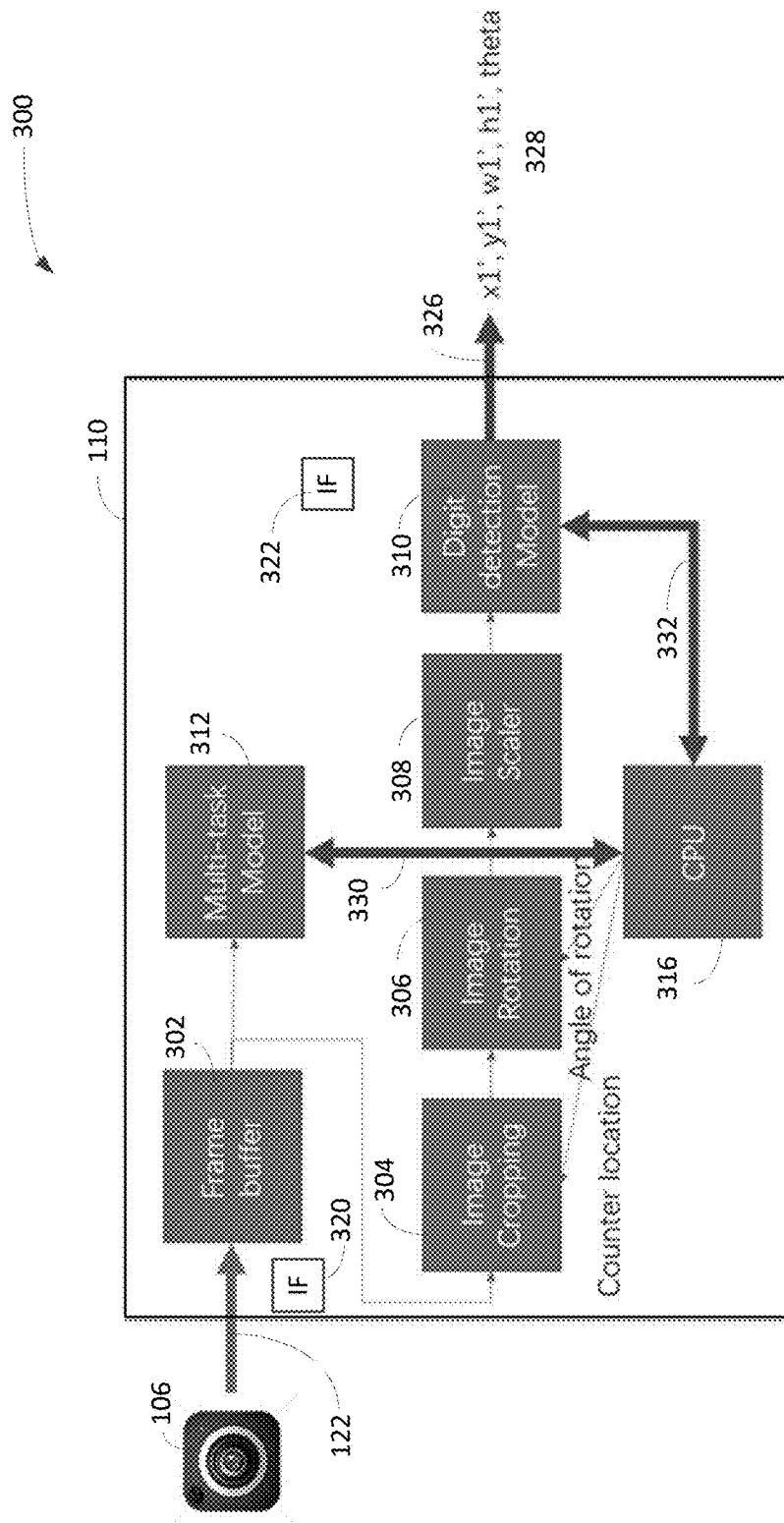
FIG. 3 is a block diagram illustrating a localization module or DLM and a camera for generating coordinates associated to a captured image in accordance with one embodiment of the present invention.

FIG. 3 is a block diagram 300 illustrating a localization module or DLM and a camera for generating coordinates associated to a captured image in accordance with one embodiment of the present invention. Camera 106 and DLM 110 are connected via CL bus 122 wherein camera 106 is responsible to take pictures or images in accordance with its field of view. A function of DLM 110 is to generate a set of coordinates for calibrating AMS based on images from camera 106. It should be noted that the underlying concept of the exemplary embodiment(s) of the present invention would not change if one or more blocks (ICs or elements) were added to or removed from diagram 300.

DLM 110, in one embodiment, includes a frame buffer 302, an image cropping unit 304, an image rotation unit 306, an image scaler 308, a digit detection model 310, a central processing unit ("CPU") 316, and a multi-task model 312. Frame buffer 302, in one example, can be a semiconductor memory device capable of electronically storing digital information. The semiconductor memory includes, but not limited to, random-access memory ("RAM"), static RAM ("SRAM"), dynamic RAM ("DRAM"), flash memory, phase-change memory, magnetoresistive RAM ("MRAM"), and the like. Upon receipt of captured images from camera 106, DLM stores the captured images in frame buffer 302. The captured images, which include the readout counter images, are subsequently forwarded to multi-task model 312 and image cropping unit 304. It should be noted that a readout counter image is a digitized electronic copy of a readout counter value displayed by the meter. Depending on the processing picture taking as well as field of view, the readout counter image may be a distorted version of the readout counter value.

Multi-task model 312, in one example, is a Machine Learning ("ML") model which can be used to optimize a particular metric or task via learning and repetition process. To optimize a task, a single ML model or a cluster of models are used for training output a desirable outcome. To improve task performance such as identifying original orientation of readout counter value, multi-task model 312, in one aspect, shares representations of related tasks to improve performance. A function of multi-task model 312 is to detect the counter within the image and identify whether the counter in the image is distorted or not. If the distortion is detected, multi-task model 312 predicts a likelihood angle of rotation needed to restore the counter (readout counter image) to its original readout counter value displayed by the meter.

Multi-task model 312, in one example, includes a multi-task learning model used to facilitate for object detection (for position and size) such as YOLO (You Only Look Once) model or SSD (Single Shot MultiBox Detector) model as well as classification or regression (for orientation) purposes. After calculating and/or identifying the angle of rotation and/or other attributes, the angle such as θ and attributes are forwarded to CPU 316. The attributes (i.e., xi', yi', wi', hi', θ) indicate the discrepancy or distortion between the original readout counter value by the meter and the counter in the image.

Image cropping unit 304, in one embodiment, is used to identify a counter location in view of the captured image. The counter location, for example, is a minimal boundary around the readout counter image. Upon receipt of the captured image, image cropping unit 304 identifies the bounding box containing distorted readout counter value based on the counter location and angle of rotation received from multi-task model 312 via CUP 316. After cropping, the cropped image containing the bounding box is forwarded to image rotation unit 306.

Image rotation unit 306 is configured to rotate the distorted readout counter value or readout counter image within the bounding box to a non-distorted readout counter value or original readout counter value displayed by the meter based on the angle of rotation. The angle of rotation and/or attributes are from CPU 316. Note that the angle and coordinates are obtained from multi-task model 312 as indicated by numeral 330. The cropped and rotated readout counter image is forwarded to image scaler 308.

Image scaler 308 is used to resize or scale the cropped and rotated readout counter image to a predefined size and/or scale. After scaling, the scaled readout counter image is forwarded to digit detection model 310. Note that the scaled readout counter image should be the same or substantially the same as the readout counter value.

Digit detection model 310, in one aspect, is used to detect the digit, digits, number, numbers, dial, dials, and the like in view of the scaled readout counter image. Based on detected digit or digits, digit detection model 310 generates a set of coordinates 328 in accordance with the attributes and angle from CPU 316 as indicated by numeral 332.

CPU 316, also known as central processor, main processor, processor, or controller, is capable of performing a set of computational functions based on a set of executable instructions. CPU 316, in one embodiment, includes a neural processing unit ("NPU") to assist multi-task model 312 for performing computational tasks more efficiently. Also, CPU 316 is used to manage the data flows within DLM 110.

DLM 110, in one example, also includes communication interfaces 320-322. Interface 320 is used to facilitate data transmission such as captured images between camera 106 and DLM 110 via communication channel or CL bus 122. In one example, interface 320 is capable of facilitating data transmission via wires or cables. Alternatively, interface 320 is configured to facilitate data transmission via wireless communication. Interface 322 is used to facilitate data transmission such as coordinates 328 between DLM 110 and DRM via communication channel or LR bus 326. In one example, interface 322 is capable of facilitating data transmission via wires or cables. Alternatively, interface 322 is configured to facilitate data transmission via wireless communication.

DLM 110, in one embodiment, is capable of being removed from AMS after the calibration process. Since the distance (or field of view) between camera 106 and the display of meter is fixed, the coordinates generally do not change. Accordingly, DLM 110 is not needed for AMS once the calibration process (or coordinates) is done.

An FPGA, in one embodiment, is used to host DLM 110. For example, FPGA can be programmed to embed DLM 110. Since DLM 110 contains multi-task model 312, a relatively large size of FPGA may be required to handle multi-task machine learning. If wireless communications are used, a wireless FPGA or WAP can be used to host DLM 110.

An advantage of using wireless communications for CL bus 122 and LR bus 326 is that it is relatively easy for connecting or disconnecting DLM to or from AMS.

Figure 4:
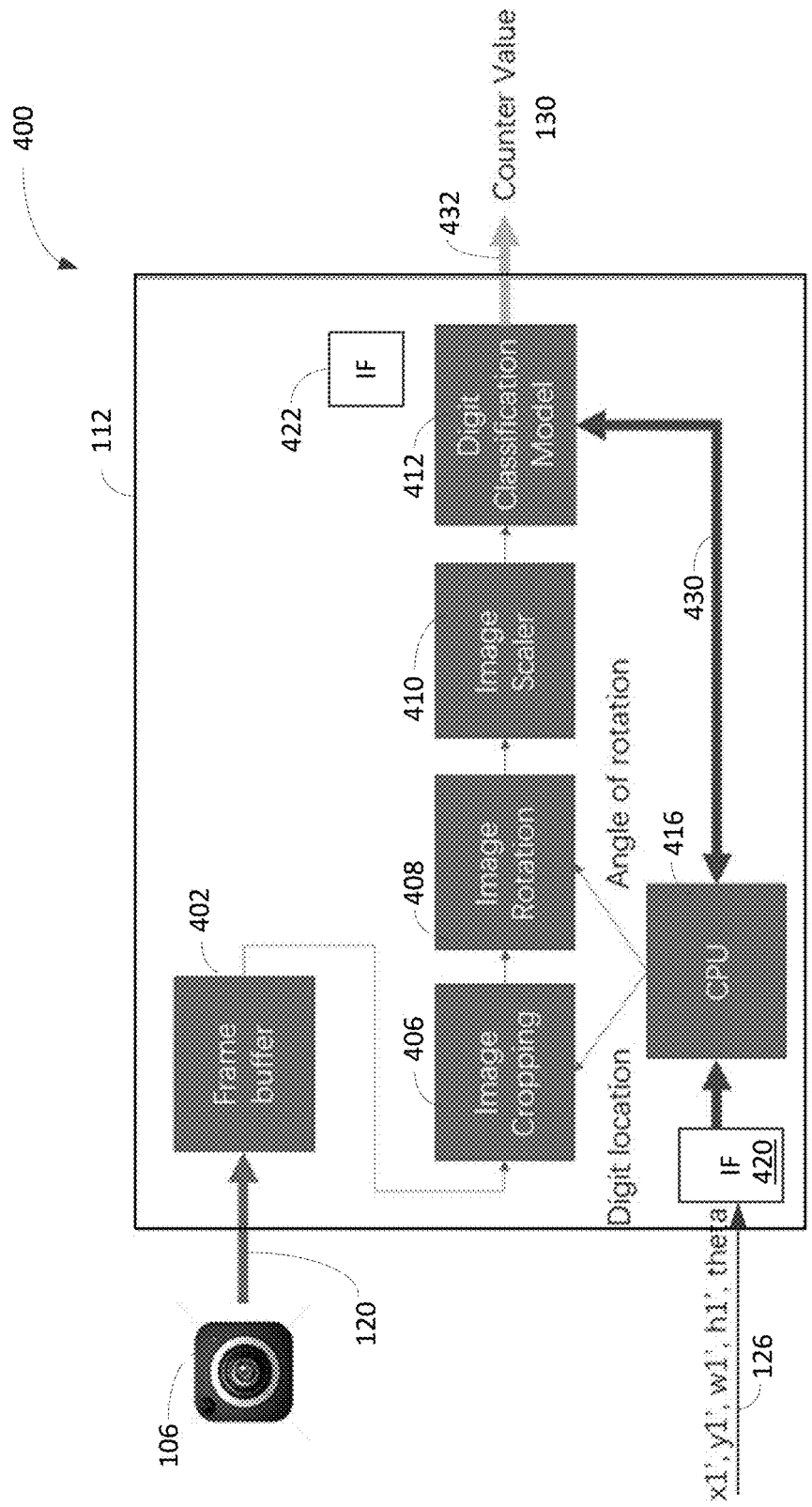
FIG. 4 is a block diagram illustrating a recognition module or DRM configured to generate the counter value in accordance with one embodiment of the present invention.

FIG. 4 is a block diagram 400 illustrating a recognition module or DRM configured to generate the counter value 130 in accordance with one embodiment of the present invention. Diagram 400 includes camera 106 and DRM 112 wherein camera 106 and DRM 112 are connected via CR bus 120. Camera 106 is responsible to take pictures or capture images in accordance with its field of view. A function of DRM 112 is to generate a sequence of digits as counter value 130 for AMS based on images from camera 106. It should be noted that the underlying concept of the exemplary embodiment(s) of the present invention would not change if one or more blocks (ICs or elements) were added to or removed from diagram 400.

DRM 112, in one embodiment, includes a frame buffer 402, image cropping unit 406, image rotation unit 408, image scaler 410, digit classification model 412, and CPU 416. Frame buffer 402, in one example, is a semiconductor memory device capable of electronically storing digital information. The semiconductor memory includes, but not limited to, random-access memory ("RAM"), static RAM ("SRAM"), dynamic RAM ("DRAM"), flash memory, phase-change memory, magnetoresistive RAM ("MRAM"), and the like. Upon receipt of the captured images from camera 106, DRM 112 stores the captured images in frame buffer 402.

DRM 112, in one aspect, includes communication interfaces 420-422. Interface 420 is used to facilitate data transmission such as the coordinates (i.e., x1', y1', w1', h1' and θ) of one or more digits from DLM via communication channel or LR bus 126. Interface 420 is capable of facilitating data transmission via wires or cables. Alternatively, interface 420 can be configured to facilitate data transmission via wireless communication. Interface 422 is used to facilitate data transmission output such as counter value via a communication channel or an output channel 432. In one example, interface 422 outputs counter value 130 to user(s) via wires or cables. Alternatively, interface 422 transmits counter value 130 via wireless communication network. Upon receipt of the coordinates from DLM, the coordinates are subsequently passed to CPU 416.

CPU 416, which can be a central processor, main processor, processor, or controller, is capable of performing a set of functions based on executable instructions. CPU 416, in one embodiment, includes an NPU for assisting digit classification model 412 for enhancing overall performance. One function of CPU 416 is to distribute the information of coordinates to various blocks such as image cropping unit 406 and/or image rotation unit 408. Another function of CPU 416 is to manage data flows within DRM 112.

Image cropping unit 406, in one embodiment, is used to crop the captured image. Upon retrieving the captured image from frame buffer 402, image cropping unit 406 identifies the bounding box containing distorted readout digit value or readout digit image based on the digit location from CPU 416. After cropping, the cropped image containing distorted readout digit value is forwarded to image rotation unit 408.

Image rotation unit 406 rotates the distorted readout digit value to a non-distorted or substantially non-distorted readout digit value based on the angle of rotation from CPU 416. Note that the non-distorted or substantially non-distorted readout digit value should be fairly close to the original readout digit value displayed by the meter. The cropped and rotated readout digit image is forwarded to image scaler 410.

Image scaler 410 is used to resize or scale the cropped and rotated readout digit image to a predefined size or more desirable scale. After scaling, the scaled readout digit image is forwarded to digit classification model 412. Note that the scaled readout digit image should be the same or substantially the same as the readout digit value.

Digit classification model 412, in one aspect, is used to recognize the digits, numbers, and/or dials. Based on the recognition, digit classification outputs digit values one by one and combines into counter value(s) 130 based on the coordinates provided by CPU 416 as indicated by numeral 430.

In one embodiment, an FPGA is used to host DRM 112. For example, FPGA can be programmed to perform functions relating to frame buffer 402, CPU 416, interfaces 420-422, image cropping unit 406, image rotation unit 408, image scaler 410, and digit classification model 412. If wireless communications are used, a wireless FPGA or WAP can be used to host DRM 112.

An advantage of using DRM 112 is to reduce potential misclassification of readout counter value. For example, numbers 1 and 7 or 6 and 9 are directional sensitive and they can be misclassified due to rotation of digits. As such, cropping, rotating, and scaling can be important for generating accurate counter value 130.

Figure 5:
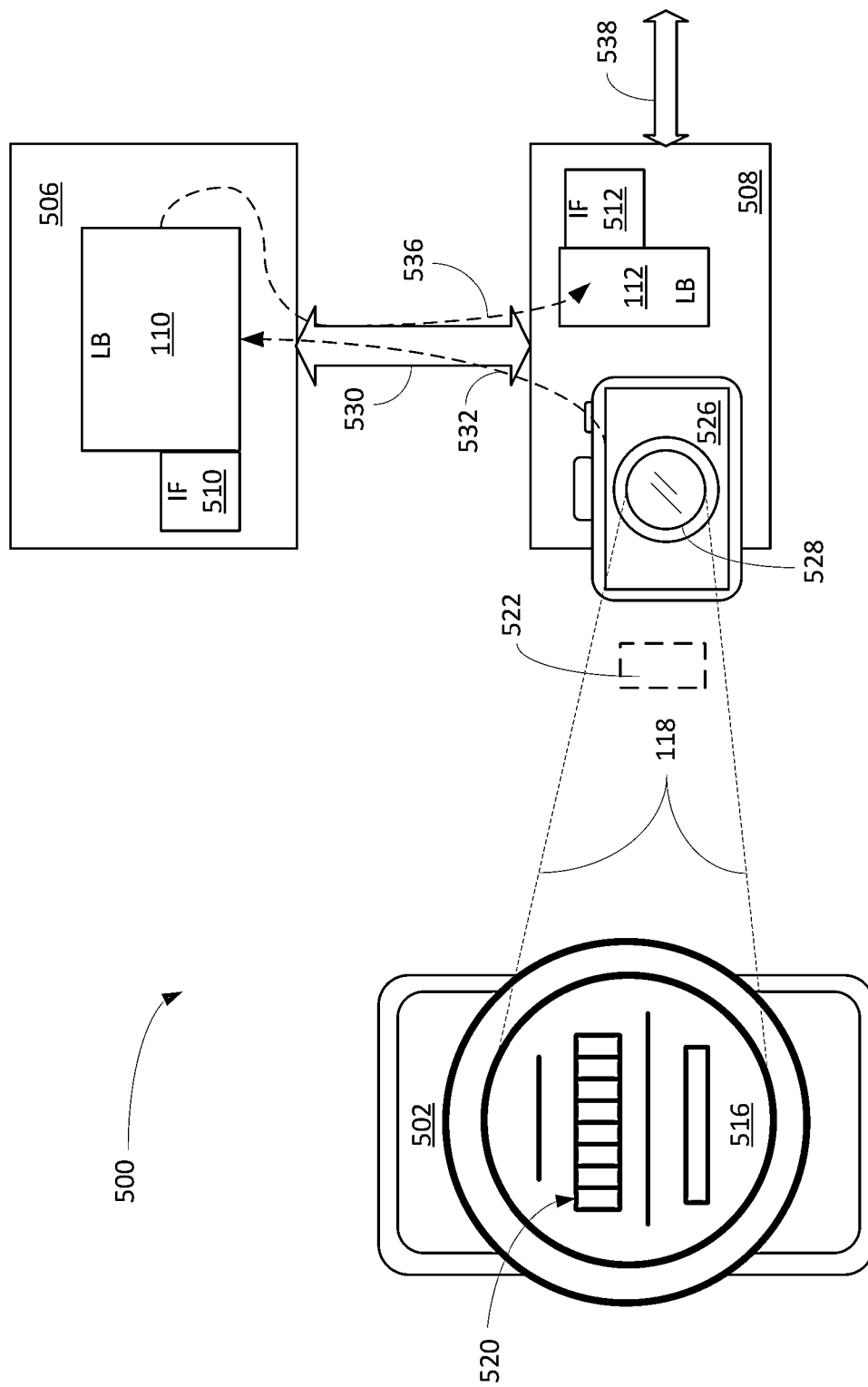
FIG. 5 is a block diagrams illustrating measuring system or AMS using a two-module approach in accordance with one embodiment of the present invention.

FIG. 5 is a block diagram illustrating measuring system or AMS 500 using a two-module approach in accordance with one embodiment of the present invention. AMS 500 illustrates a meter 502 with a two-module approach wherein the first module is DRM 508 and the second module is DLM 506. While DRM 508, in one embodiment, is permanently coupled to meter 502, DLM 506 is removed from AMS 500 after calibration. It should be noted that the underlying concept of the exemplary embodiment(s) of the present invention would not change if one or more blocks (ICs or elements) were added to or removed from FIG. 5.

Meter 502 includes a display 516 configured to display or project an original readout counter value 520 which indicates the measured amount of substance or resources such as electricity or water consumed over a period of time. Meter 502 can be an electro-mechanical meter, electricity meter, electric meter, electrical meter, energy meter, kilowatt-hour meter, gas meter, displacement water meter, pressure meter, thermal instrument, heat sensor, or the like. Meter 502 is generally located or installed at the customer's or consumer's premise for metering, measuring, sensing, and/or managing.

Camera 526, in one embodiment, is placed, fixed, or anchored at a predefined distance from display 516 whereby field of view 118 between display 516 and camera 106 is fixed. Camera 526 can be a semiconductor based camera with lens 528 fabricated in a single chip or IC. Alternatively, camera 526 is constructed as a part of FPGA fabricated on the same die. When field of view 118 includes display 516 showing readout counter value 520, camera 526 can capture an image based on field of view 118 wherein the image may present a distorted readout counter value or readout counter image 522 depending the distance and/or orientation of lens 528 positioned in front of meter 502.

DRM 508, which is a first module, is configured to be permanently installed in the consumer's premise nearby meter 502. In one embodiment, an FPGA containing configurable logic blocks ("LB") 112 and interface block ("IF") 512 is configured to host or imbed DRM 508. If DRM 508 requires wireless communication capability, a WAP or wireless FPGA may be used to perform various DRM functions.

DLM 506, which is a second module, is configured to be removed once the calibration phase is completed. In one embodiment, an FPGA containing configurable logic blocks ("LB") 110 and interface block ("IF") 510 is configured to host DLM 506. If DLM 506 requires wireless communication capability, a WAP or wireless FPGA may be used to perform various DLM functions. The calibration phase, in one aspect, is a process of identifying coordinates based on the captured image(s) using multi-task model(s). Since multi-task model requires sophisticated circuitry such as ML models and computations, a large FPGA or wireless FPGA may be needed to perform various DLM functions.

In operation, camera 526 captures an image containing readout counter image 522 via field of view 118 focusing on readout counter value 520 projected by display 516. Readout counter image 522 is subsequently passed to DLM 506 as indicated by numeral 532 via a communication channel 530. Upon identifying the coordinates and angle of rotation by DLM 506, the coordinates and angle are transmitted to DRM 508 as indicated by numeral 536. After retrieving readout counter image 522 from a storage location, DRM 506 restores readout counter image 522 to readout counter value 520 in accordance with the coordinates and angle of rotation. After restoration, the counter value is generated based on the original or similar to original readout counter value.

A benefit of employing AMS 500 is that by attaching DRM to the meter, it modifies a traditional metering instrument into a smart metering instrument capable of meter reading and managing remotely.

An AMS or measuring system 500, in an alternative embodiment, contains one or more configurable ICs or FPGAs for processing information in accordance with optical images. System 500 includes a metering instrument, a measuring device, and a localization module. The metering instrument such as meter 502 contains at least one display for visually displaying a number and measures the amount of measurable substance passing through the metering instrument within a predefined period. The measuring device such as DRM 508, including a camera situated in front of the display of the metering instrument, is configured to capture an image of the number representing at least a portion the measurable substance. The localization module such as DLM 506 which is removably coupled to the measuring device is operable to generate the coordinates via an onboard multi-task model block in accordance with the image received from the camera.

In one aspect, the measuring device includes a recognition module such as DRM 508 operable to generate a value in response to the image of the number and coordinates for identifying orientation of the image. The localization module, in one example, includes a camera interface and a controller wherein the camera interface is configured to facilitate removably coupling to the camera via a CL communication for receiving the image from the camera. The controller facilitates to generate the coordinates in accordance with the angle prediction. It should be noted that the recognition module can be configured and embedded in an FPGA.

One embodiment of the presently claimed invention is to use a two-module approach to enhance overall efficiency and simplification. While one module is for digit recognition which is installed on site, the other module is used during installation and calibration. After calibration, the module such as DLM 506, is removed. DLM 506 employs a multi-task model for detecting the counter and simultaneously predicting the orientation of the counter. The benefit of using the two-module approach is to break down the task into localization and recognition subtasks. Since counter detection is more critical, a more accurate and complicated model in a higher performance computer hardware or chip is more desirable for DLM. A lower performance computer hardware or IC can be used to run the simpler classification models such as DRM for recognizing the digits. For example, DRM is capable of cropping, rotating, and scaling the digit images based on the information provided by DLM whereby DRM is able to accurately recognize every digit and outputs the counter value.

An advantage of employing two-module approach is to simplify onsite installation whereby reducing resources and cost since a large module (i.e., DLM) is removed from AMS after calibration.

Figure 6:
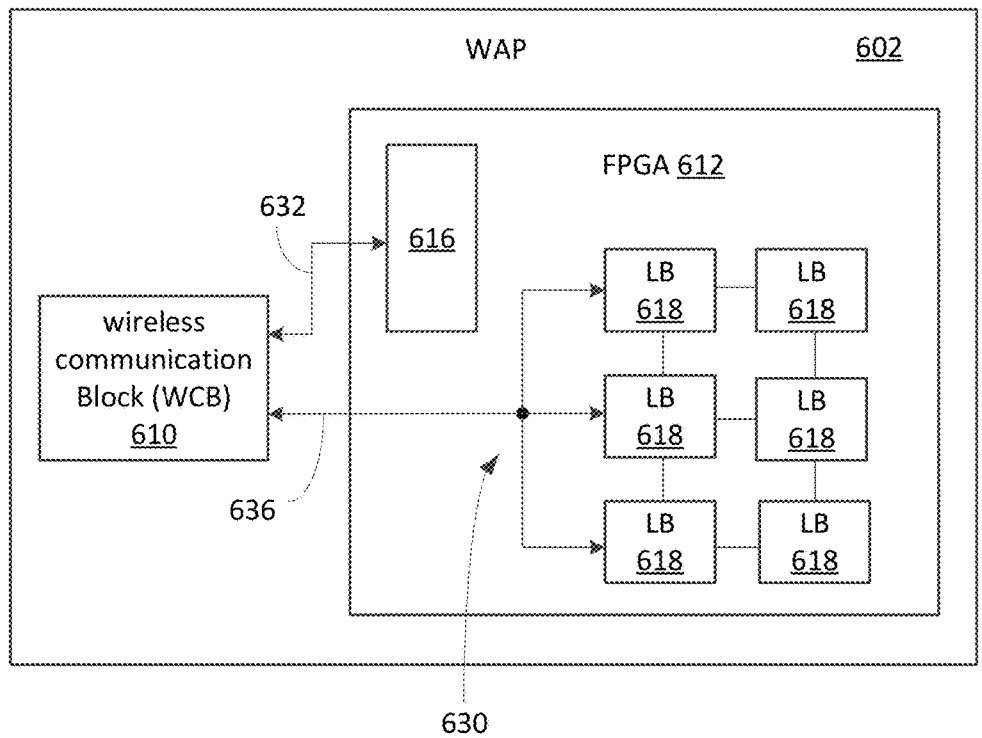
FIGS. 6-7 are block diagrams illustrating a wireless accessible PLD ("WAP") capable of providing wireless FPGA for hosting at least a portion of the measuring system in accordance with one embodiment of the present invention in accordance with one embodiment of the present invention.

FIG. 6 is a block diagram illustrating a wireless accessible PLD ("WAP") capable of providing wireless FPGA for hosting DLM or DRM in accordance with one embodiment of the present invention in accordance with one embodiment of the present invention. It should be noted that the terms "FPGA" and "PLD" are referring to the same or similar configurable logic device that can be programmed to perform user desirable functions after fabrication. WAP 602 includes wireless communication block ("WCB") 610 and FPGA 612 which is also known as FPGA die, PLD die, FPGA chip, or PLD chip. FPGA 612 further includes configuration download block ("CDB") 616 and configurable LBs (logic blocks) 618 wherein configurable LBs 618 can be programmed or configured by bitstream(s), bitstream file(s), or configuration bitstream(s) to perform specific logic function(s). It should be noted that the underlying concept of the exemplary embodiment(s) of the present invention would not change if one or more blocks (circuit or elements) were added to or removed from FIG. 6.

WCB 610, in one aspect, is a circuit or component configured to provide or facilitate wireless communication between FPGA 612 and an external remote system. For example, a function of WCB is to provide a wireless communication able to transmit or receive information between WAP 602 and an external remote system via a wireless communication network. The wireless communications network includes, but not limited to, Wi-Fi, Bluetooth, cellular, satellite, and/or radio networks. WCB 610 can be a circuit fabricated within an FPGA. Alternatively, WCB 610 can be placed in a semiconductor die or chip which can be packaged together with FPGA on a module or package.

FPGA 612 is a semiconductor integrated circuit ("IC") or die containing various configurable LB s as well as memory cells capable of being programmed by a user after the IC is fabricated. To program or configure an FPGA to perform a user defined logic function, a set of bitstreams may be used to program the FPGA to perform user desirable functions. In one example, FPGA includes arrays of configurable LBs and routing fabric wherein the routing fabric as indicated by numeral 630 further contains various reconfigurable interconnects used to connect various LBs.

WAP 602, in one example, is a module containing an FPGA 612 and WCB 610 for facilitating wireless bitstream download for programming FPGA as well as debugging FPGA. WCB 610, in one example, is coupled to CDB 616 via connection 632 for facilitating operation of the programming mode. Similarly, WCB 610 connects to LBs via connection 636 for facilitating operation of the logic access mode. Depending on the applications, connections 632-636 can be merged into one connection. WAP 602, in another example, includes a wireless module such as WCB 610 and an FPGA die such as FPGA 612 wherein WCB 610 and FPGA 612 are packaged onto a single package.

In an alternative embodiment, an IC is fabricated or manufactured to contain a PSD such as WAP 602 configured to have a wireless block and an FPGA block. WAP 602 includes a set of configurable LBs 618, routing fabric 630, CDB 616, and WCB 610, wherein configurable LBs 618 are able to be selectively programmed to perform one or more logic functions. Routing fabric 630 is configured to selectively route information between configurable LBs 618 and input/output ports based on a routing configuration bitstream or configuration signals. CDB 616 includes a memory which is used to store configuration data such as bitstream for programming configurable LBs 618 as well as routing fabric 630.

WCB 610 is operable to facilitate wireless programming or wireless debugging configurable LBs 618 via a wireless communications network. In one example, WCB 610 includes a Wi-Fi transmitter and a Wi-Fi receiver. Alternatively, WCB 610 includes a cellular transmitter and a cellular receiver. WCB 610 can also include a Bluetooth transmitter and a Bluetooth receiver. Depending on the applications, WCB 610 may be configured to select one or more built-in selectable Wi-Fi transceiver and Bluetooth transceiver.

It should be noted that WAP 602 provides an FPGA wireless programming download/debug circuit system containing a wireless module such as WCB 610 and an FPGA module such as LBs 618. The wireless module, connected with CDB 616, is used to implement a configuration mode. In one aspect, the wireless module connected to the FPGA logic resource are used to realize the user mode. It should be noted that the two modes can be dynamically switched based on the control signals.

One advantage of using a PSD having a wireless block such as WAP 602 is that it is able to provide a wireless program downloading/debugging a PSD such as an FPGA without a physically connected host system.

Figure 7:
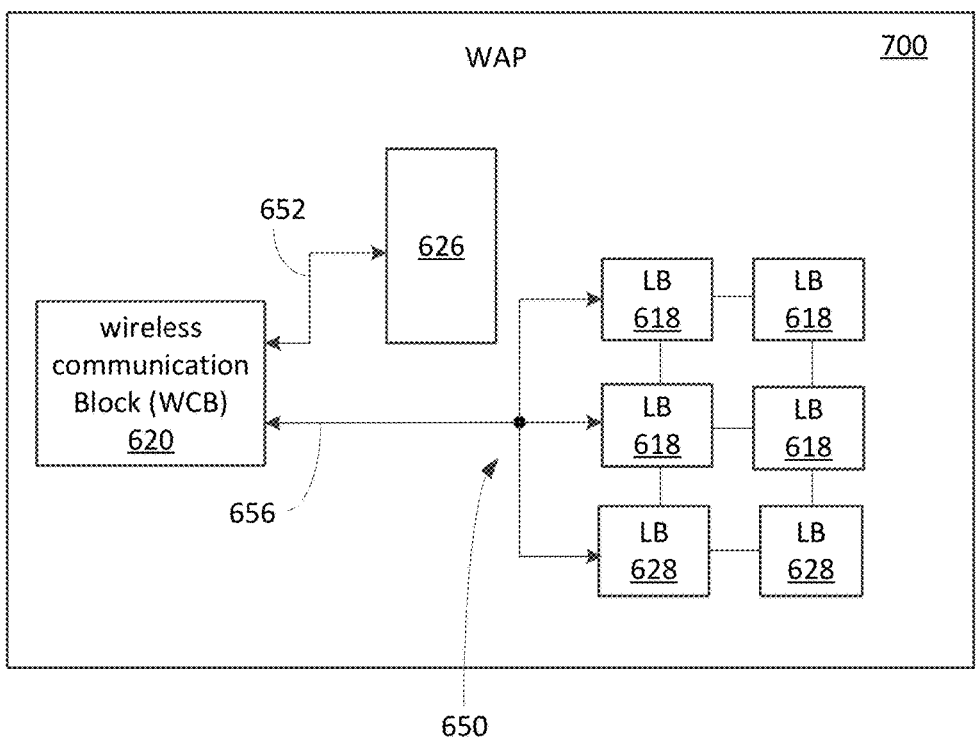

FIG. 7 is block diagram illustrating an IC or semiconductor chip containing a WAP 700 capable of facilitating wireless FPGA programming for hosting DLM or DRM in accordance with one embodiment of the present invention in accordance with one embodiment of the present invention. WAP 700 includes WCB 620, CDB 626, and configurable LBs 628 wherein configurable LBs 628 are programmed or configured by configuration bitstream(s) to perform configured logic function(s). WAP 606, in one aspect, is similar to WAP 602 shown in FIG. 6 except that WCB 620, CDB 626, and LBs 628 are fabricated on a single IC or chip. It should be noted that the underlying concept of the exemplary embodiment(s) of the present invention would not change if one or more blocks (circuit or elements) were added to or removed from FIG. 7.

Since WCB 620, CDB 626, and LBs 628 are placed or fabricated on a single IC, die, and/or chip, the layout of WAP 606 improves circuit integration whereby reducing resource allocation as well as enhancing efficiency. In one embodiment, WAP 700 is configured to have a programming (or configuration) mode and a user mode (or logic access mode). WCB 620, in one embodiment, facilitates wireless data transmission between WAP 700 and an external remote system, not shown in FIG. 7. The data transmission includes configuration bitstream for programming/reprogramming FPGA. The data transmission also includes input data from the remote system to WAP 606 or output data from WAP 606 to the remote system.

When the programming mode is activated, WCB 620 downloads netlist or updated configuration bitstream from a remote system via a wireless communications network. The bitstream, also known as bitstream file, is forwarded from WCB 620 to CDB 626 via connection 652. At least a portion of LBs 628 is subsequently programmed or reconfigured by CDB 626 based on the bitstream. When the logic access mode is active, WAP allows a user or user system to wirelessly access programmed FPGA logic functions. For instance, a user can remotely provide an input to a logic function of FPGA via WCB 620 using connection 656 and/or routing fabric 650. The result generated by the logic function of FPGA or LBs 628 is subsequently transmitted to the user via WCB 620. Depending on the applications, connections 650-656 can be merged into one configurable fabric.

One advantage of using WAP 700 is to increase integration and save design costs while improving resource utilization.

Figure 8:
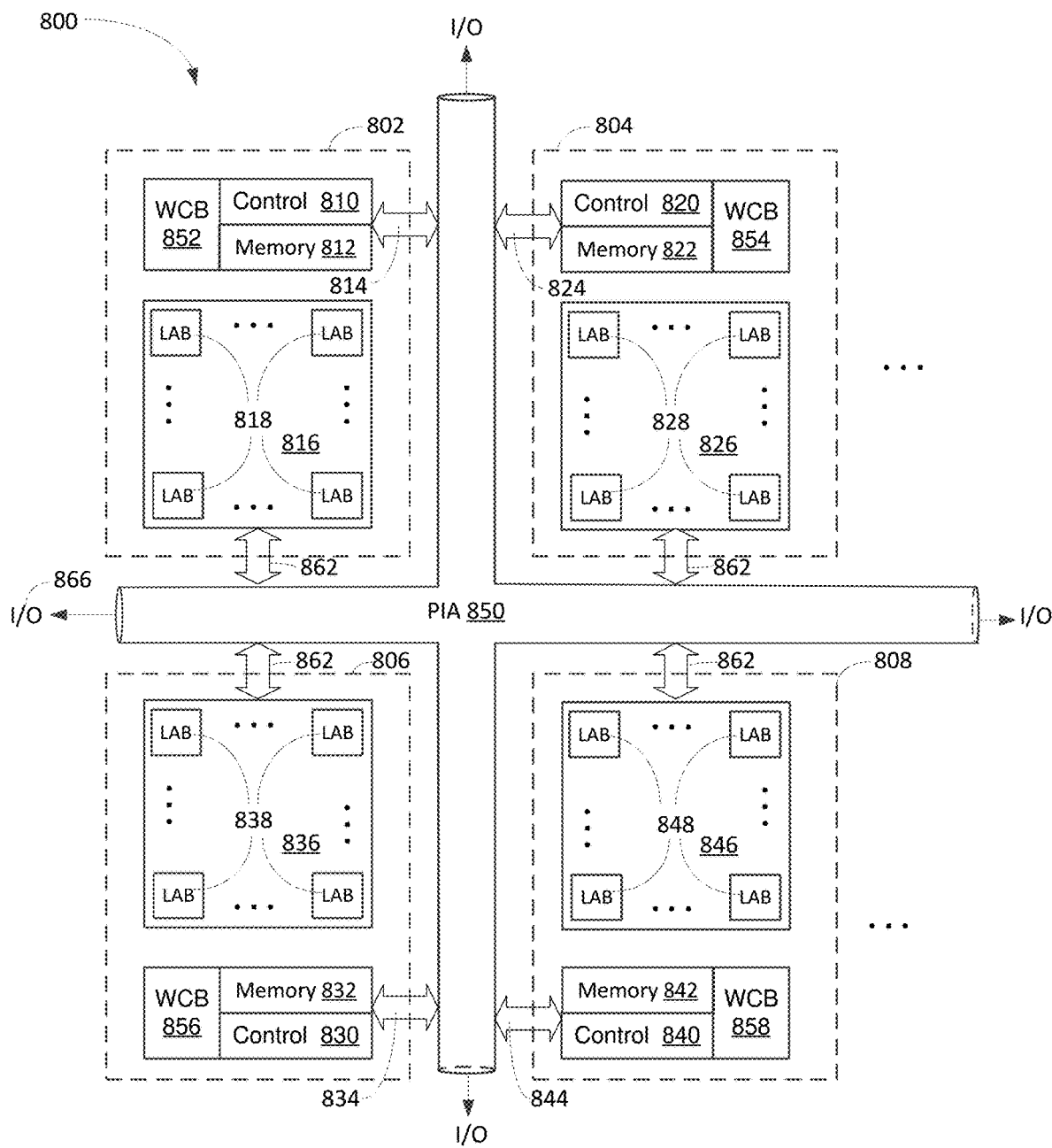
FIGS. 8-9 are diagrams illustrating an FPGA containing one or more WCBs capable of being programmed to perform at least some functions of a measuring system in accordance with one embodiment of the present invention.

FIG. 8 is a diagram illustrating an FPGA containing one or more WCBs capable of being programmed to perform at least some functions of a measuring system in accordance with one embodiment of the present invention. Diagram 800 includes multiple programmable partitioned regions ("PPR") 802-808, a programmable interconnection array ("PIA") 850, internal power distribution fabric, and regional input/output ("I/O") ports 866. PPRs 802-808 further includes control units 810, 820, 830, 840, memories 812, 822, 832, 842, configurable WCBs 852-858, and logic blocks ("LBs") 816, 826, 836, 846. Note that control units 810, 820, 830, 840 can be configured into one single control unit, and similarly, memory 812, 822, 832, 843 can also be configured into one single memory device for storing configurations. Furthermore, configurable WCBs 852-858 can also be to combined into one single programmable WCB. In one aspect, WAP is a PSD containing at least one FPGA and WCB. It should be noted that the underlying concept of the exemplary embodiment(s) of the present invention would not change if one or more blocks (circuit or elements) were added to or removed from diagram 800.

LBs 816, 826, 836, 846, include multiple LABs 818, 828, 838, 848, wherein each LAB can be further organized to include, among other circuits, a set of programmable logical elements ("LEs") or macrocells, not shown in FIG. 8. Each LAB, in one example, may include anywhere from 32 to 512 programmable LEs. I/O pins (not shown in FIG. 8), LABs, and LEs are linked by PIA 850 and/or other buses, such as buses 862, 814, 824, 834, 844, for facilitating communication between PIA 850 and PPRs 802-808.

Each LE includes programmable circuits such as the product-term matrix, and registers. For example, every LE can be independently configured to perform sequential and/or combinatorial logic operation(s). It should be noted that the underlying concept of PSD would not change if one or more blocks and/or circuits were added or removed from PSD.

Control units 810, 820, 830, 840, also known as configuration logics, can be a single control unit. Control unit 810, for instance, manages and/or configures individual LE in LAB 818 based on the configuration stored in memory 812. It should be noted that some I/O ports or I/O pins are configurable so that they can be configured as input pins and/or output pins. Some I/O pins are programmed as bi-directional I/O pins while other I/O pins are programmed as unidirectional I/O pins. The control units such as unit 810 is used to handle and/or manage PSD operations in accordance with system clock signals.

LBs 816, 826, 836, 846 are programmable by the end user(s). Depending on the applications, LBs can be configured to perform user specific functions based on a predefined functional library facilitated by configuration software. PSD, in some applications, also includes a set fixed circuits for performing specific functions. For example, PSD can include a portion of semiconductor area for a fixed non-programmable processor for enhance computation power.

PIA 850 is coupled to LB s 816, 826, 836, 846 via various internal buses such as buses 814, 824, 834, 844, 862. In some embodiments, buses 814, 824, 834, 844, and 862 are part of PIA 850. Each bus includes channels or wires for transmitting signals. It should be noted that the terms channel, routing channel, wire, bus, connection, and interconnection are referred to the same or similar connections and will be used interchangeably herein. PIA 850 can also be used to receives and/or transmits data directly or indirectly from/to other devices via I/O pins and LAB s.

A function of WCB such as WCB 852 is a special purpose communication unit capable of transmitting or receiving information between WAP and an external remote system via a wireless communication network. A configurable or programmable WCB, in one aspect, is able to be programmed to facilitate wireless communication using a wireless communication, such as, but not limited to, Wi-Fi, Bluetooth, cellular, satellite, and/or radio networks.

An advantage of employing a programmable WCB is to enable AMS to independently communicate with an external system via wireless communication network.

Figure 9:
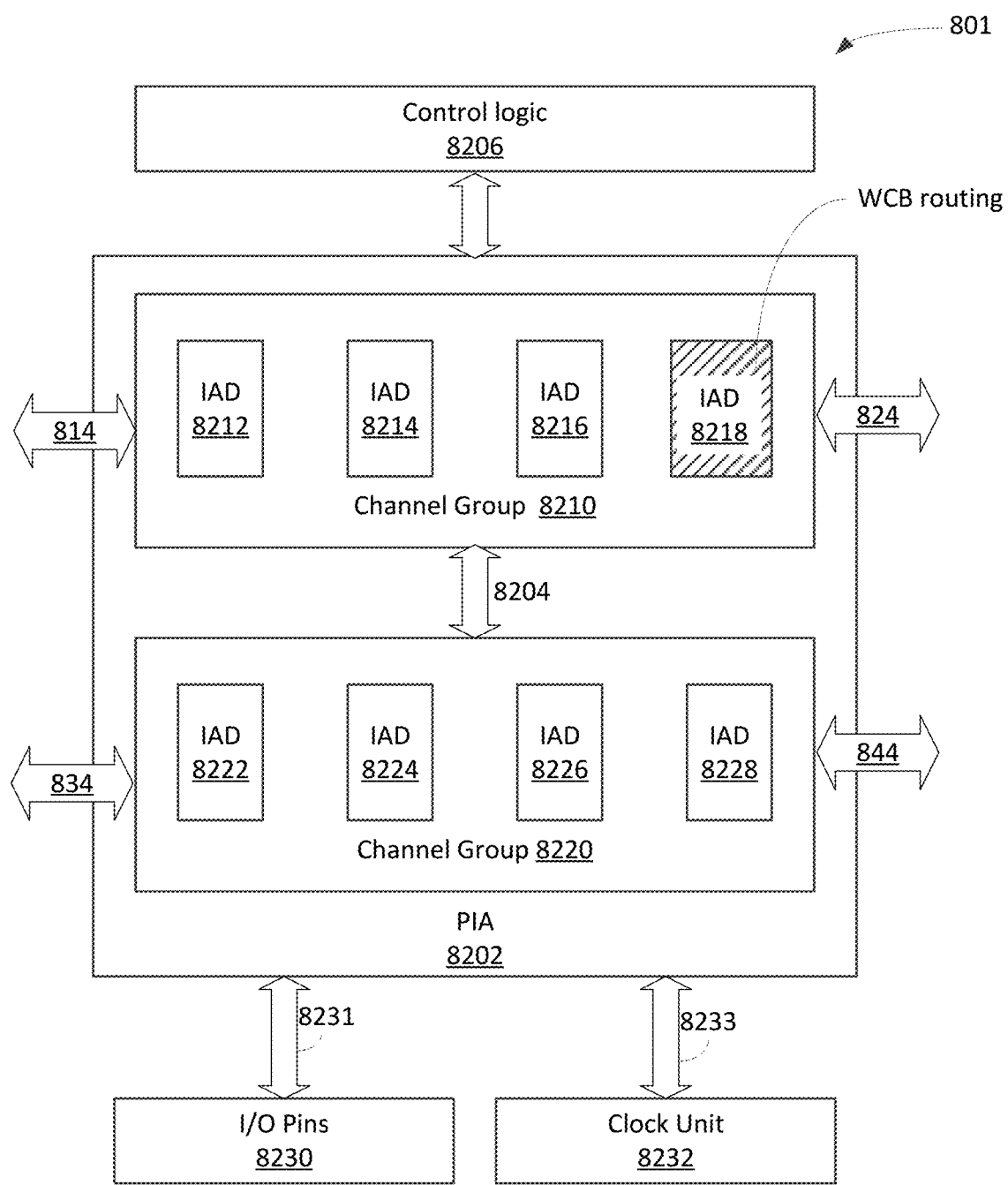

FIG. 9 is a diagram 801 illustrating a routing logic or fabric containing programmable arrays for facilitating interconnecting various components including WCB routing in accordance with one embodiment of the present invention. Diagram 801 includes control logic 8206, PIA 8202, I/O pins 8230, and clock unit 8232. Control logic 8206, which may be similar to control units shown in FIG. 8, provides various control functions including channel assignment, differential I/O standards, and clock management. Control logic 8206 may contain volatile memory, non-volatile memory, and/or a combination of volatile and nonvolatile memory device for storing information such as configuration data. In one embodiment, control logic 8206 is incorporated into PIA 8202. It should be noted that the underlying concept of the exemplary embodiment(s) of the present invention would not change if one or more blocks (circuit or elements) were added to or removed from diagram 801.

I/O pins 8230, connected to PIA 8202 via a bus 8231, contain multiple programmable I/O pins configured to receive and/or transmit signals to external devices. Each programmable I/O pin, for instance, can be configured to input, output, and/or bi-directional pin. Depending on the applications, I/O pins 8230 may be incorporated into control logic 8206.

Clock unit 8232, in one example, connected to PIA 8202 via a bus 8233, receives various clock signals from other components, such as a clock tree circuit or a global clock oscillator. Clock unit 8232, in one instance, generates clock signals in response to system clocks as well as reference clocks for implementing I/O communications. Depending on the applications, clock unit 8232, for example, provides clock signals to PIA 8202 including reference clock(s).

PIA 8202, in one aspect, is organized into an array scheme including channel groups 8210 and 8220, bus 8204, and I/O buses 814, 824, 834, 844. Channel groups 8210, 8220 are used to facilitate routing information between LB s based on PIA configurations. Channel groups can also communicate with each other via internal buses or connections such as bus 8204. Channel group 8210 further includes interconnect array decoders ("IADs") 8212-8218. Channel group 8220 includes four IADs 8222-8228. A function of IAD is to provide a configurable routing resources for data transmission.

IAD such as IAD 8212 includes routing multiplexers or selectors for routing signals between I/O pins, feedback outputs, and/or LAB inputs to reach their destinations. For example, an IAD can include up to 36 multiplexers which can be laid out in four banks wherein each bank contains nine rows of multiplexers. It should be noted that the number of IADs within each channel group is a function of the number of LEs within the LAB.

PIA 8202, in one embodiment, designates a special IAD such as IAD 8218 for handling WCB routing. For example, IAD 8218 is designated to handle connections and/or routings between WCB and the LAB s to facilitate data transmission using a wireless network. It should be noted that additional IADs may be allocated for handling WCB operations.

An advantage of using IAD 8218 within PIA as a designated WCB routing is that it integrates WCB with FPGA to provide network communication using a detected nearby wireless communications network.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 10:
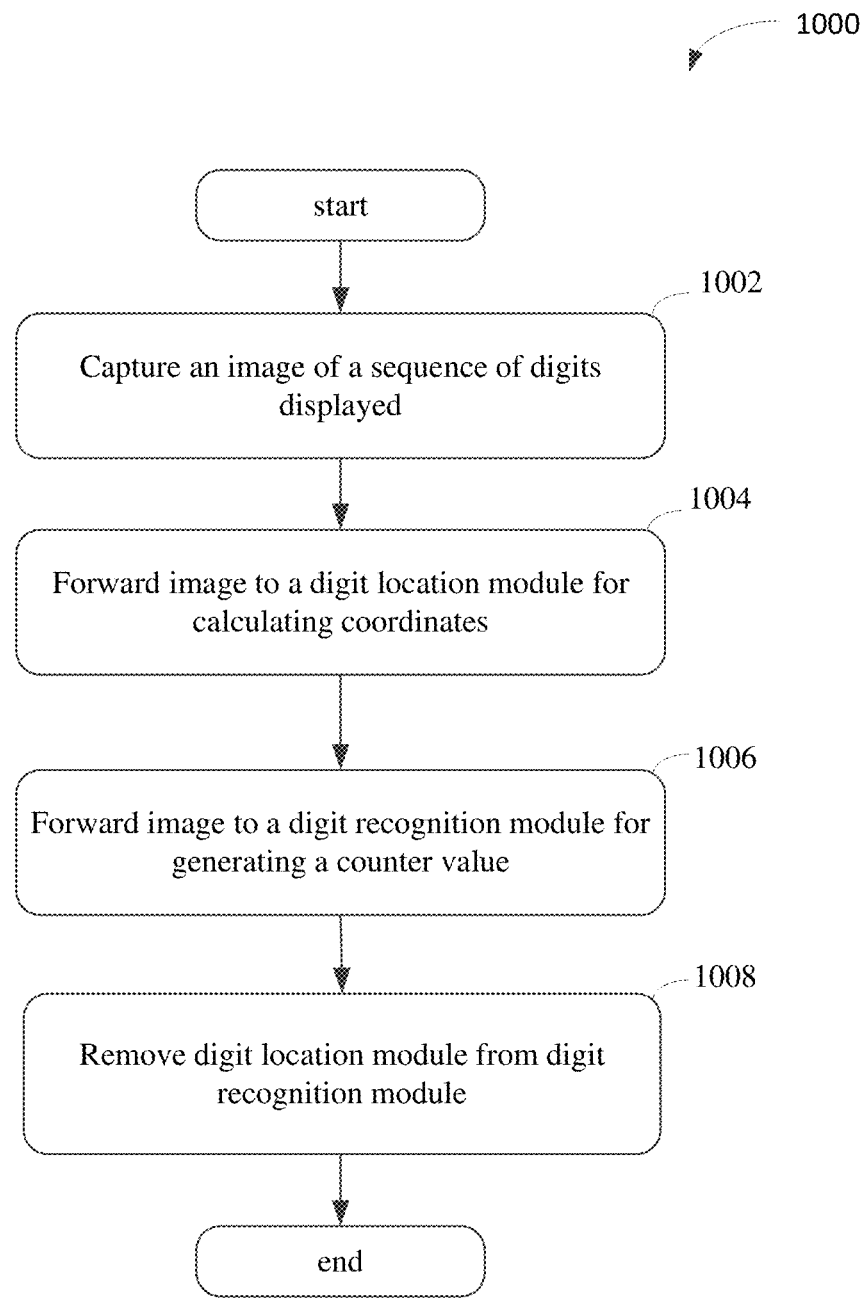
FIG. 10 is a flowchart illustrating a process of obtaining a counter value via a measuring system in accordance with one embodiment of the present invention.

FIG. 10 is a flowchart 1000 illustrating a process of obtaining a counter value via a measuring system in accordance with one embodiment of the present invention. At block 1002, a process capable of identifying captured images using configurable ICs is able to capture an image of a sequence of digits displayed by a meter for measuring utility usage via a camera. The process, for example, is capable of activating an onboard camera situated in front of an electricity meter to take a picture containing a sequence of digits representing usage of electricity within a predefined time period.

At block 1004, the image is forwarded to DLM for calculating coordinates. In one embodiment, a multi-task model is activated to calculate the coordinates for obtaining orientation of the sequence of digits. In one aspect, the process facilitates data transmission via a wireless network through an onboard wireless communication block of an FPGA.

At block 1006, the image is forwarded to DRM for generating a counter value based on the image and the coordinates. In one example, the process facilitates transmission of the counter value via a wireless network using an onboard WCB of FPGA.

At block 1008, DLM is subsequently removed from the digit recognition module after the coordinates are computed.

Figure 11:
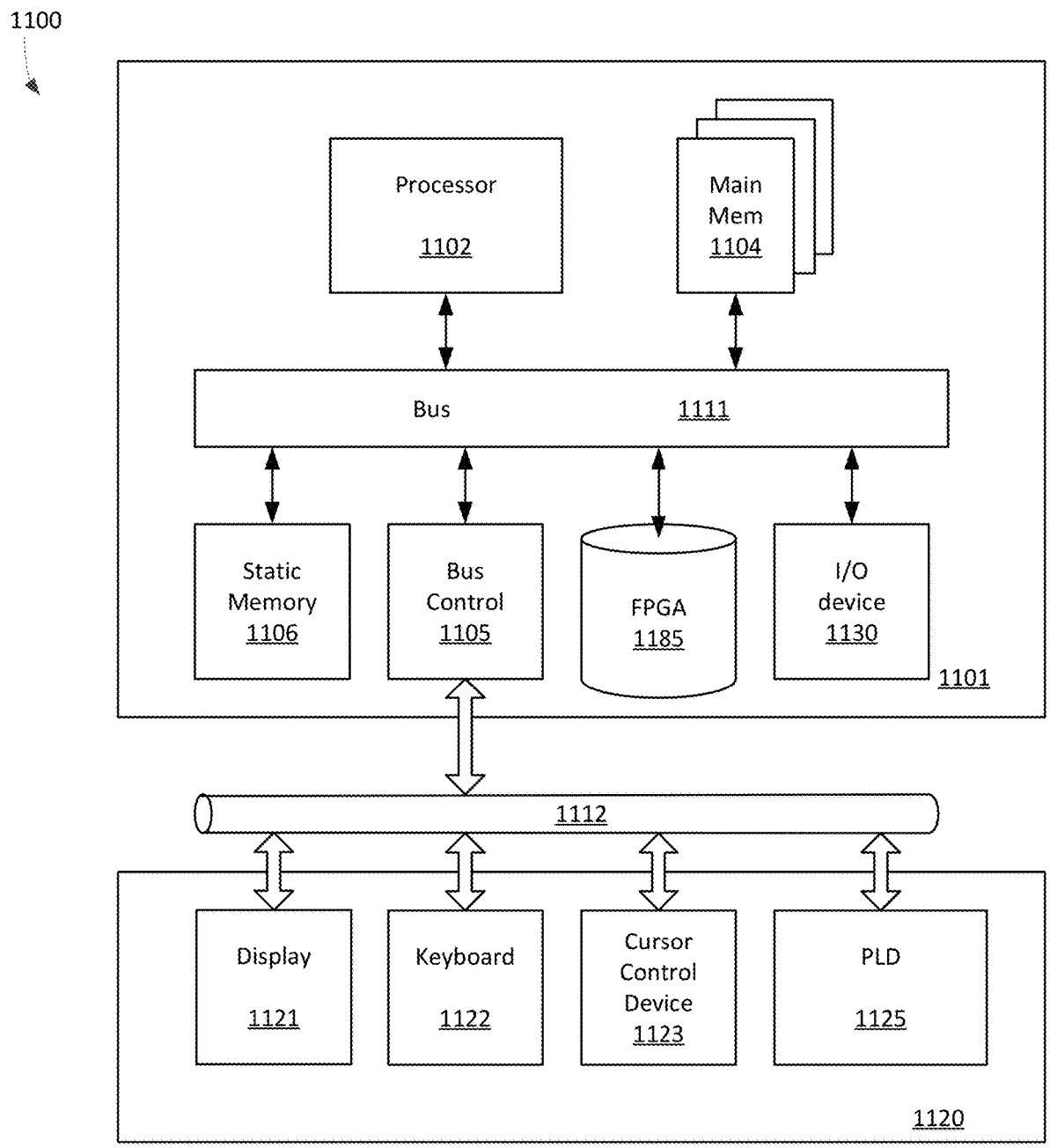
FIGS. 11-12 are diagrams illustrating a digital processing system and a cloud-based system environment using one or more measuring systems having FPGAs in accordance with one embodiment of the present invention.

FIG. 11 is a diagram illustrating a digital processing system which can be used as AMS for meter reading employing FPGAs in accordance with one embodiment of the present invention. Computer system 1100 includes a processing unit 1101, an interface bus 1112, and an input/output ("TO") unit 1120. Processing unit 1101 includes a processor 1102, main memory 1104, system bus 1111, static memory device 1106, bus control unit 1105, I/O element 1130, and FPGA 1185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, Ryzen™, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112. Mass storage memory or SSD which may be a magnetic disk, an optical disk, hard disk drive, floppy disk, CD-ROM, and/or flash memories are used for storing large amounts of data.

I/O unit 1120, in one embodiment, includes a display 1121, keyboard 1122, cursor control device 1123, and PLD 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

PLD 1125 is coupled to bus 1112 for providing configurable logic functions to local as well as remote computers or servers through wide-area network. PLD 1125 and/or FPGA 1185 includes one or more WCBs for facilitating wireless access. In one example, PLD 1125 may be used in a modem or a network interface device for facilitating communication between computer 1100 and the network. Computer system 1100 may be coupled to a number of servers via a network infrastructure as illustrated in the following discussion.

Figure 12:
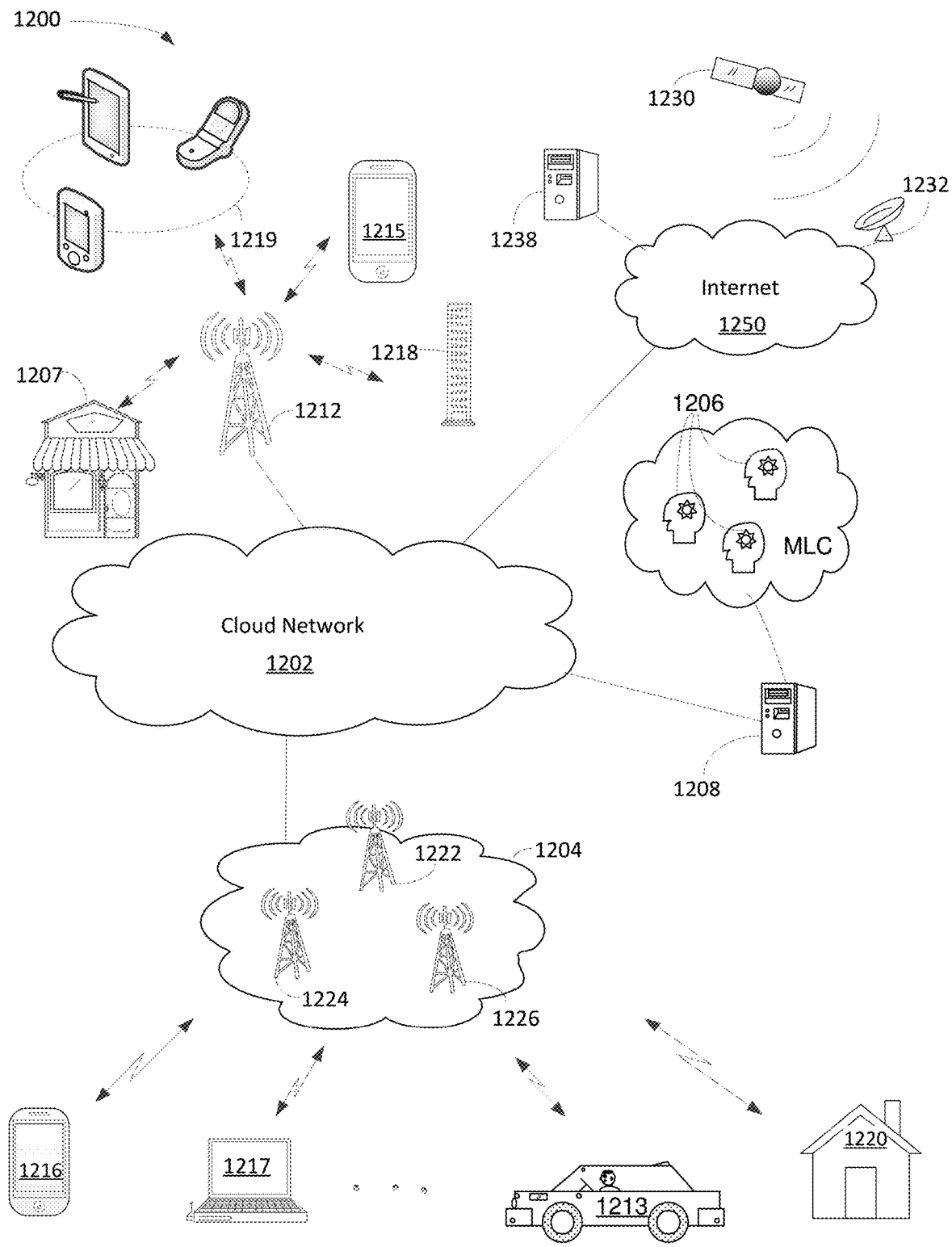

FIG. 12 is a diagram 1200 illustrating a cloud-based system environment using one or more measuring systems in accordance with one embodiment of the present invention. Diagram 1200 illustrates AI server 1208, communication network 1202, switching network 1204, Internet 1250, and portable electric devices 1213-1219. In one aspect, PSD or WAP having various WCBs can be used in AI server, portable electric devices, and/or switching network. Network or cloud network 1202 can be wide area network ("WAN"), metropolitan area network ("MAN"), local area network ("LAN"), satellite/terrestrial network, or a combination of WAN, MAN, and LAN. It should be noted that the underlying concept of the exemplary embodiment(s) of the present invention would not change if one or more blocks (or networks) were added to or removed from diagram 1200.

Network 1202 includes multiple network nodes, not shown in FIG. 12B, wherein each node may include mobility management entity ("MME"), radio network controller ("RNC"), serving gateway ("S-GW"), packet data network gateway ("P-GW"), or Home Agent to provide various network functions. Network 1202 is coupled to Internet 1250, AI server 1208, base station 1212, and switching network 1204. Server 1208, in one embodiment, includes machine learning computers ("MLC") 1206.

Switching network 1204, which can be referred to as packet core network, includes cell sites 1222-1226 capable of providing radio access communication, such as 3G ($3^{rd}$ generation), 4G, or 5G cellular networks. Switching network 1204, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 1204 is logically coupling multiple users and/or mobiles 1216-1220 across a geographic area via cellular and/or wireless networks. It should be noted that the geographic area may refer to a campus, city, metropolitan area, country, continent, or the like.

Base station 1212, also known as cell site, node B, or eNodeB, includes a radio tower capable of coupling to various user equipments ("UEs") and/or electrical user equipments ("EUEs"). The term UEs and EUEs are referring to the similar portable devices and they can be used interchangeably. For example, UEs or PEDs can be cellular phone 1215, laptop computer 1217, iPhone® 1216, tablets and/or iPad® 1219 via wireless communications. Handheld device can also be a smartphone, such as iPhone®, BlackBerry®, Android®, and so on. Base station 1212, in one example, facilitates network communication between mobile devices such as portable handheld device 1215 or 1219 via wired and/or wireless communications networks. It should be noted that base station 1212 may include additional radio towers as well as other land switching circuitry.

Internet 1250 is a computing network using Transmission Control Protocol/Internet Protocol ("TCP/IP") to provide linkage between geographically separated devices for communication. Internet 1250, in one example, couples to supplier server 1238 and satellite network 1230 via satellite receiver 1232. Satellite network 1230, in one example, can provide many functions as wireless communication as well as global positioning system ("GPS"). It should be noted that WAP can be applied to many fields, such as, but not limited to, smartphones 1215-1216, satellite network 1230, automobiles 1213, AI server 1208, business 1207, and homes 1220.

While embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A system containing a field-programmable gate array ("FPGA") configured to process digital information, comprising:

a metering instrument containing at least one display for visually displaying a number and configured to record amount of measurable substance within a predefined time period;

a camera coupled to the metering instrument and configured to capture an image of the number representing at least a portion of the amount of measurable substance;

a recognition module operable to generate a counter value in response to the image and coordinates utilized for minimizing image distortion; and an FPGA configured to facilitate removably coupling to a localization module via a localization-to-recognition communication for supplying coordinates from the FPGA to the recognition module via a recognition interface block, the FPGA configured to have,
a first portion of FPGA programmed to perform an interface function for facilitating removably coupling to the camera via a camera-to-localization communication for receiving images from the camera;
a second portion of FPGA programmed to perform a multi-task function for detecting at least one digit from the image and an angle prediction;
a third portion of FPGA programmed to perform a control function for generating a set of coordinates at least partially based the angle prediction;
a fourth portion of FPGA configured to perform a forwarding function for sending the set of coordinates to a recognition module via a localization-to-recognition bus.

2. The system of claim 1, wherein the metering instrument is one of electrical meter for metering usage of electricity, gas meter for measuring usage of natural gas, thermal meter for metering heat or cold, steam meter for measuring steam, and water meter for counting usage of water.

3. The system of claim 1, wherein the camera is an optical device having a lens capable of capturing one or more images displayed by the display of the metering instrument.

4. The system of claim 1, wherein the camera is an optical device configured to capture a sequence of digits displayed by the display.

5. The system of claim 1, wherein the localization module is removably coupled to the camera and operable to generate the coordinates in accordance with the image received from the camera.

6. The system of claim 1, wherein the camera-to-localization communication is a wireless connection via a local onboard wireless transceiver block.

7. The system of claim 1, wherein the localization-to-recognition communication is a wireless connection via a local onboard wireless transceiver block.

8. The system of claim 1, wherein the FPGA further includes:
an image cropping block coupled to the controller and operable to crop boundaries of the image based on the coordinates; and
an image rotation block coupled to the controller and operable to rotate the image based on the angle prediction.

9. The system of claim 1, wherein the measurable moving substance is electricity, natural gas, oil, air, heat, pressure, steam, and water.

10. The system of claim 1, wherein the FPGA further includes:
an image cropping block operable to crop boundaries of the image based on at least one digit location; and
an image rotation block operable to rotate the image based on the angle of rotation.

11. A system containing a field-programmable gate array ("FPGA") configured to process information, comprising:
a metering instrument containing at least one display for visually displaying a number and configured to record amount of measurable substance within a predefined time period;
a camera coupled to the metering instrument and configured to capture an image of the number representing at least a portion of the amount of measurable substance;
a recognition module operable to generate a counter value in response to the image and coordinates utilized for minimizing image distortion; and
an FPGA configured to facilitate removably coupling to a localization module via a localization-to-recognition communication for supplying coordinates from the FPGA to the recognition module via a recognition interface block, the FPGA configured to have,
a first portion of FPGA programmed to perform a first interface function for facilitating receipt of images captured by the camera via a camera-to-recognition bus for receiving images from the camera;
a second portion of FPGA programmed to perform a second interface function for receiving coordinates generated by the localization module via a localization-to-recognition bus for obtaining an angle prediction;
a third portion of FPGA programmed to perform a decoding function for restoring counter image in response to the coordinates;
a fourth portion of FPGA configured to perform a calculating function for generating a counter value indicating an amount of substance consumed.

12. The system of claim 11, wherein the metering instrument is configured to measure amount of measurable substance passing through the metering instrument within a predefined period.

13. The system of 11, wherein the measuring instrument includes a digital camera situated in front of the display of the metering instrument and configured to capture an image of the number representing at least a portion the measurable substance.

14. The system of claim 11, wherein the localization module is removably coupled to the measuring device and operable to generate the coordinates via an onboard multi-task model block in accordance with the image received from the camera.

15. The system of claim 11, wherein the FPGA is operable to generate a value in response to image of number and coordinates for identifying orientation of the image.

16. A method of processing captured images via utilization of one or more field-programmable gate arrays ("FPGAs"), comprising:
programming a first portion of FPGA for facilitating removably coupling to a camera via a camera-to-localization communication for receiving images from the camera;
configuring a second portion of FPGA to detect at least one digit from the image and an angle prediction;
programming a third portion of FPGA to generate coordinates at least partially based the angle prediction;
configuring a fourth portion of FPGA to send the coordinates to a recognition module via a localization-to-recognition bus;
displaying a number indicating amount of measurable substance recorded within a predefined time period;
capturing an image of the number representing at least a portion of the amount of measurable substance;
generating a counter value in response to the image and coordinates utilized for minimizing image distortion; and
coupling the FPGA to a localization module via a localization-to-recognition communication for supplying coordinates from the FPGA to the recognition module via a recognition interface block.

17. The method of claim 16, wherein capturing includes recording an image of a sequence of digits displayed by a meter for measuring utility usage via the camera, and forwarding the image to the digit localization module for calculating coordinates.

18. The method of claim 17, further comprising removing the digit localization module from the digit recognition module after the coordinates are computed.

19. The method of claim 16, further comprising forwarding the image to the digit recognition module for generating a counter value based on the image and the coordinates.

20. The method of claim 19, wherein forwarding the image to a digit localization module includes activating a multi-task model to calculating coordinates for obtaining orientation of the sequence of digits.

21. The method of claim 16, wherein capturing an image includes activating an onboard camera situated in front of an electricity meter to take a picture containing a sequence of digits representing usage of electricity within a predefined time period.

22. The method of claim 16, further comprising transmitting the coordinates from the digit localization module to the digit recognition module for generation of a counter value.

\* \* \* \* \*